United States Patent
Hessmert et al.

(10) Patent No.: US 6,604,041 B2
(45) Date of Patent: Aug. 5, 2003

(54) METHOD AND SYSTEM FOR LIMITING THE ENGINE TORQUE OF VEHICLES

(75) Inventors: Ulrich Hessmert, Schwieberdingen (DE); Jost Brachert, Ditzingen (DE); Thomas Sauter, Remseck (DE); Helmut Wandel, Markgroeningen (DE); Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/026,056

(22) Filed: Dec. 21, 2001

(65) Prior Publication Data

US 2002/0138191 A1 Sep. 26, 2002

(30) Foreign Application Priority Data

Dec. 28, 2000 (DE) .......................... 100 65 527

(51) Int. Cl.[7] ................. G06F 7/00
(52) U.S. Cl. .......................... 701/86; 701/88
(58) Field of Search .................. 701/84, 85, 86, 701/87, 88; 180/197

(56) References Cited

U.S. PATENT DOCUMENTS 5,333,108 A * 7/1994 Hessmert et al. ...... 364/426.03

FOREIGN PATENT DOCUMENTS

| DE | 196 11 839 | 10/1997 |
| DE | 196 12 825.0 | 10/1997 |
| DE | 196 20 581 | 11/1997 |

OTHER PUBLICATIONS

Stöcker, Jörg et al: Der *"Intelligente Reifen"—Zwischenergebnisse einer interdisziplinären Forschungskooperation* (The "Intelligent Tire"—Intermediate results of an inter–disciplinary research cooperation). In: ATZ Automobiltechnische Zeitschrift 97, 1995, 12, p. 824–832*.

* cited by examiner

*Primary Examiner*—Yonel Beaulieu
(74) *Attorney, Agent, or Firm*—Kenyon & Kenyon

(57) ABSTRACT

A method and a system for limiting an engine torque of vehicles to a maximum value. In the method, signals representing wheel torques from wheel sensors at the drive train are acquired, the wheel torques, differentiated according to driving situations which can have a harmful influence on the transmission, differential or torque converter, then being checked for a wheel-torque value which is too high. If too high a value is found, the engine torque is limited or reduced.

9 Claims, 2 Drawing Sheets

METHOD AND SYSTEM FOR LIMITING THE ENGINE TORQUE OF VEHICLES

BACKGROUND INFORMATION

In the case of vehicles with strong motorization, particularly when backing up at full load, the transmission, i.e. the reverse gear can be damaged.

Furthermore, during TCS braking interventions (i.e. traction-control-system braking interventions) on gradients with different coefficients of friction between the left and right vehicle side, the differential is subject to an extreme stress which can lead to destruction of the transmission and/or the differential.

For vehicles in trailer operation, in response to slippage occurring at wheels, such as in the case of the so-called $\mu$-split (split-friction road surface), situations can exist on gradients in which the vehicle does not pick up any speed, in spite of full load. The slipping wheel is braked via the TCS braking intervention. The applied braking torque, the force of the trailer itself, and the downgrade force acting on the vehicle and the trailer can be greater than the engine torque supplied by the engine at a specific engine speed. For vehicles having automatic transmission, the result is that the specified engine torque, minus the torque converted in the brake, is converted in the converter of the automatic transmission into thermal energy, which means it can already be destroyed after a relatively short time.

The examples indicated show that it is necessary to protect the transmission, converter and differential of a vehicle from being destroyed, by reducing or limiting an engine torque. German Patent No. 196 11 839 describes, inter alia, an example for limiting the torque delivered by an internal combustion engine, in order to protect the transmission. In that case, a maximum coupling torque is preset as a function of speed and/or velocity of the vehicle, given the drive position engaged. From this torque, taking into consideration the torque losses of the drive unit and torque portions of the loads, a maximum combustion torque is formed which is not to be exceeded.

The restriction to a maximum combustion torque, described in German Patent No. 196 11 839, is carried out in a complicated manner and lasts a certain time. In addition, the determination whether too high a (wheel-) torque is occurring in the drive train is carried out indirectly, and therefore can be incorrect. The lack of differentiation between driving situations in limiting the engine torque can also lead to errors.

Wheel sensors should preferably be used in the present invention. Wheel-force sensors are known in the related art, of which a few are described by way of example in the following.

From Stöcker, Jörg and others: Der "Intelligente Reifen"—Zwischenergebnisse einer interdisziplinären Forschungskooperation (The "Intelligent Tire"—Intermediate results of an inter-disciplinary research cooperation). In: ATZ Automobiltechnische Zeitschrift 97, 1995, 12, P. 824–832, it is known, for example, to equip a tire with an integrated force sensor by which it is possible to detect forces acting upon the tire in three directions, namely, the longitudinal or X direction, the transverse or Y direction and the vertical or Z direction. The signals derived from these detected forces can be supplied to an evaluation unit in which a desired evaluation of the signals is carried out.

A further device for determining the rotational properties of a vehicle wheel is known, for example, from German Patent No. 196 20 581, which describes a device for determining the rotational properties of a vehicle wheel, magnetizing areas having alternating polarity being provided, arranged uniformly in the circumferential direction of the wheel. The areas are worked into the tire wall or are applied on the tire wall. A sensing element has two or more measuring elements arranged at variable radial distance from the axis of rotation, so that in response to a deformation of the tire because of the forces acting on a tire, or as a result of the transmitted driving torque or braking torque, a change occurs in the phase relation between the measuring signals emitted by the measuring elements. The change in the phase relation is then evaluable as a measure for the torque transmitted from the wheel or the tire to the roadway, and/or the instantaneous friction coefficient.

German Patent No. 196 12 825 describes a roller bearing or a wheel bearing which is designed such that, inter alia, motive forces and/or braking forces can be determined with it.

Both the use of a sensor which is constructed according to the ATZ article or the principle described in German Patent No. 196 20 581, as well as the use of a sensor which is constructed according to the principle described in German Patent No. 196 12 825 is possible within the framework of the method and the system of the present invention.

Although tire sensors have already been described more frequently in the related art as useful for controlling or regulating the performance of vehicles, it has not yet been known till now to limit an engine torque of a vehicle with the aid of signals from such sensors.

SUMMARY OF THE INVENTION

Therefore, an object of the present invention is to provide a method and a system whereby, if necessary, an engine torque of a vehicle can be limited in a simple manner, it being possible, in particular, to ascertain in a simpler, more exact, and more differentiated manner the occurrence of torques which are too high in the drive train.

Using the method and associated system of the present invention, a torque is determined at the wheel in a simple manner with the aid of a wheel-force sensor, and is then analyzed, as dictated by specific criteria, as to whether this torque is too high. Should this be the case, the engine torque is reduced or limited.

When working with given information about the transmission step engaged, criteria for the occurrence of too high a torque at the wheel are, for example, too great a deviation of the respective torques from one another at the left and right side of the vehicle, too high an acceleration in the drive train and, particularly in the case of automatic transmissions, exceeding a critical value and simultaneous absence of an acceleration.

Given too great a deviation of the respective torques from one another at the left and right side of the vehicle, as can occur on gradients having different friction coefficients between the left and right vehicle side, in the case of $\mu$-split, the differential is extremely stressed during TCS braking interventions. In addition to a quasi-static load, an additional dynamic load occurs for vehicles whose chassis has a tendency to vibrate. With the aid of wheel-force sensors, both the static force and the dynamic force can be ascertained; upon exceeding a critical value, the engine torque can be limited or reduced to a tolerable quantity, so that the differential is protected.

In response to too high an acceleration in the drive train, as can be caused, for example, because of accelerated driving over a high curb, the drive train being stressed the most strongly when one wheel has no connection with the ground for a short time and the entire energy of the drive train is accelerating this one wheel, then the engine torque can be reduced via a rapid engine intervention, so that the drive train is not damaged. In particular, engine torque can be reduced via an engine interface by fuel-injection blank-out or ignition timing adjustment, so that the transmission is not damaged.

Upon recognition of too high a driving torque when driving in reverse at full load, the engine torque can be reduced via a suitable engine interface by electronic throttle control, fuel-injection blank-out or ignition timing adjustment, so that the transmission is not damaged.

If, when driving in trailer operation on gradients, particularly in the case of vehicles having automatic transmission and given a $\mu$-split, it is recognized in response to a detected torque at the wheel that a critical value is exceeded and a vehicle acceleration has simultaneously failed to materialize, then the torque is limited to prevent destruction of the converter by thermal energy.

When working with the method of the present invention, signals which represent a wheel force and/or a wheel torque are detected using wheel sensors. If wheel torques which are too high are recognized in the drive train, the engine torque is reduced or limited via an engine interface.

Since, in addition, the wheel speeds and wheel accelerations, respectively, particularly the speed differentials between the driven wheels of one axle, can be determined by the signals from the wheel sensors, the drive torque can be purposefully reduced in response to selected driving situations.

The wheel force and/or the wheel torque, and the wheel speeds and wheel accelerations, respectively, are ascertained from the signals of the wheel sensors, preferably as a function of characteristic curves.

The selected driving situations correspond to the criteria indicated above.

The system of the present invention for carrying out the method according to the invention has, in particular, a recognition unit for recognizing a wheel torque that is too high for a specific driving situation, in order to then signal a limiting unit that the engine torque should be limited.

DETAILED DESCRIPTION

Figure 1:
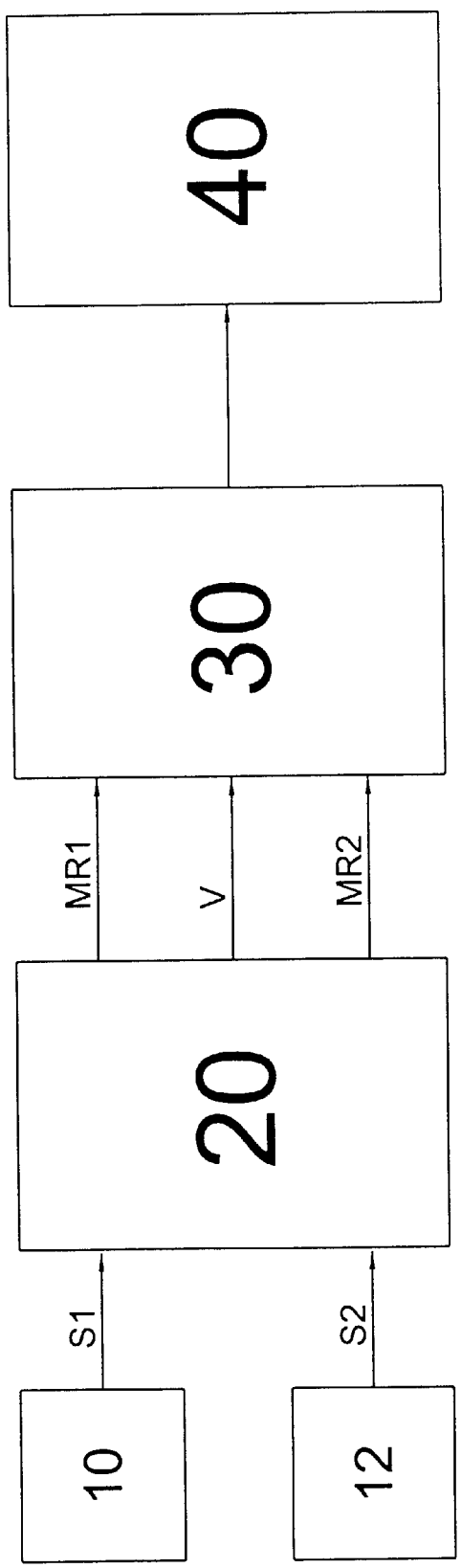
FIG. 1 shows a block diagram of a system for limiting engine torque of vehicles according to the present invention.

FIG. 1 shows a block diagram of a system for defining the method of the present invention, a two-wheel drive being selected for the representation for the sake of simplicity.

The system is made of sensors 10, 12 for the respective vehicle wheels, an evaluation unit 20, a recognition unit 30 and a limiting unit 40. Sensors 10, 12 output signals S1, S2 which are supplied to evaluation unit 20 that evaluates respective signals S1, S2 in such a way that circumferential forces or torques MR1, MR2 at each vehicle wheel are represented as signals. In addition, an evaluation is carried out, such that an acceleration AR at the wheels is also represented as a signal. Torques MR1, MR2 and acceleration AR are supplied to recognition unit 30, and there undergo an analysis for a specific driving situation, which is described in detail in connection with FIG. 2. After a specific driving situation is recognized and it is determined that it is necessary to limit the engine torque, the engine torque is limited or reduced via limiting unit 40 which has an engine interface. The reduction can be carried out, for example, by electronic throttle control, fuel-injection blank-out or ignition timing adjustment at the engine.

Figure 2:
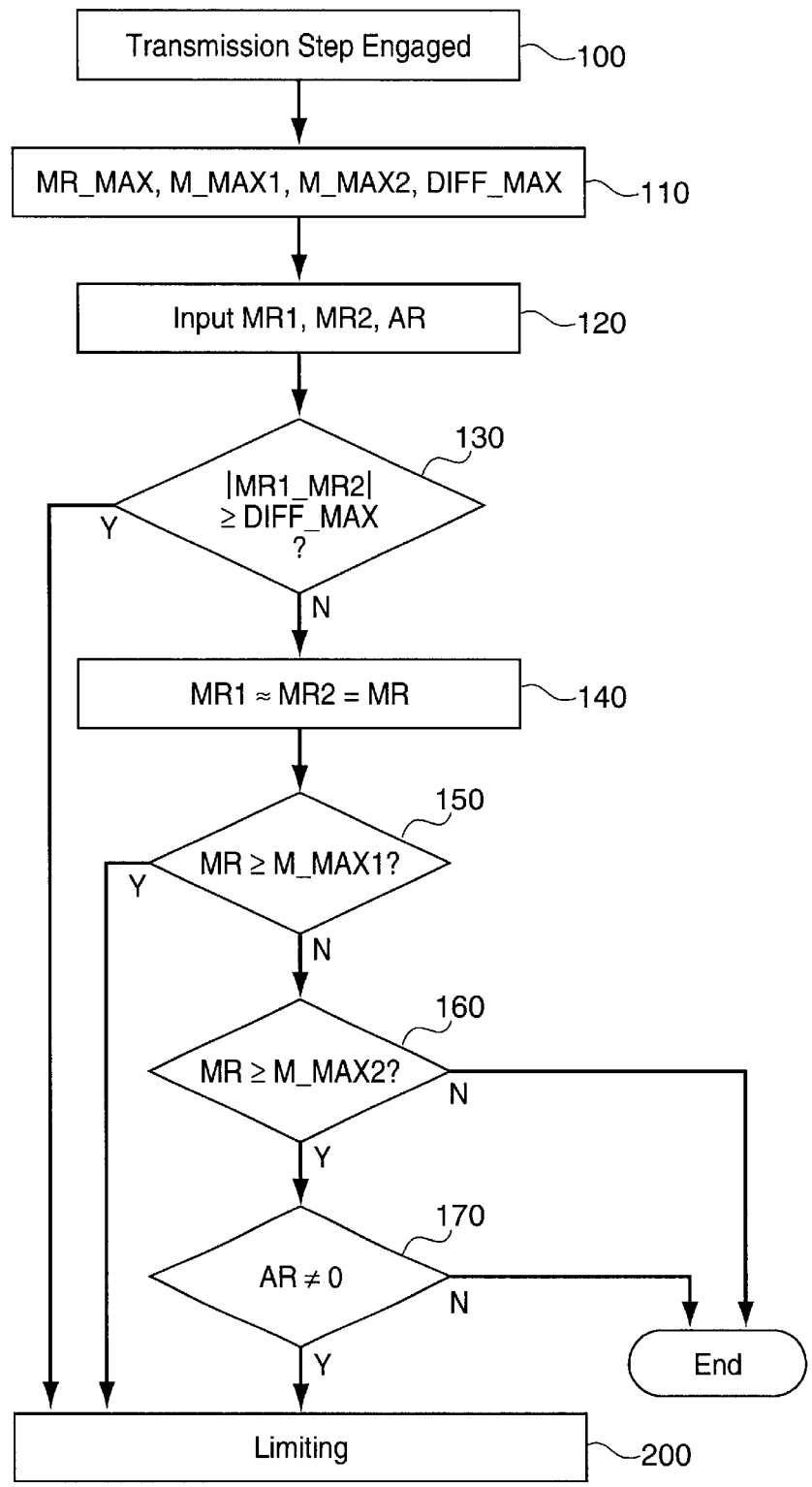
FIG. 2 represents a method sequence for limiting engine torque of vehicles according to the present invention.

FIG. 2 represents a method sequence in which it is first of all examined whether it is necessary to limit or reduce the engine torque. If the answer is in the affirmative, influence is exerted on the engine for limiting or reducing its torque. After a program start, as, for example, upon operating the ignition key, the method sequence is run through repeatedly, In a first step 100, information is obtained about a transmission step engaged. In the following step 110, quantities MR_MAX, M_MAX1 and M_MAX2 contained in it are pre-initialized. Quantity DIFF_MAX represents a maximum value for a difference between wheel torques ascertained on the left and the right side of the vehicle; quantity M_MAX1 represents a maximum wheel torque for general cases which, as a critical value, may not be exceeded, and thus is a gauge for implementing a limitation of the engine torque; and quantity M_MAX2 represents a maximum wheel torque for the case when, in addition, the vehicle acceleration fails to materialize.

After the pre-initialization, values for ascertained wheel torques MR1 and MR2 and wheel acceleration AR are input in a step 120. In a step 130, wheel torques MR1 and MR2 are compared to one another and, if the comparison result is greater than quantity DIFF_MAX, this result shows that the difference between the two values is too great and limitation of the engine torque must be implemented, as is shown in a step 200. However, if the comparison result is less than quantity DIFF_MAX, in a step 140, a single value for wheel torques MR1 and MR2 is set to a wheel torque MR, which is justified, since wheel torques MR1 and MR2 differ only negligibly. In a step 150, wheel torque MR is then compared to quantity M_MAX1, and if wheel torque MR is not less than quantity M_MAX1, this result shows that the engine torque must be limited, as is shown in a step 200. If wheel torque MR is less than quantity M_MAX1, wheel torque MR is compared to quantity M_MAX2 in a step 160. If wheel torque MR is less than M_MAX2, the run-through of the method is ended. On the other hand, in a following step 170, it is checked whether wheel acceleration AR is zero. If this is the case, this indicates an appearance of thermal energy in the converter, and the engine torque is limited in step 200. Otherwise, the run-through of the method is brought to an end.

As indicated above, the engine torque can be limited in step 200 by electronic throttle control, fuel-injection blank-out or ignition timing adjustment at the engine.

A method and a system are described for limiting the engine torque of vehicles, in which, by the recognition, according to the present invention, of too high a torque at the wheel, and by a subsequent limiting of the engine torque, damage to the transmission, differential or torque converter can be prevented. In particular, due to the possibility of a simple acceleration determination, according to the present invention, a differentiated recognition of driving situations and an appropriate reaction may additionally be carried out.

What is claimed is:

1. A method for limiting an engine torque of a vehicle, the method comprising, prior to the limiting:

detecting signals, representing instantaneous wheel torques, with the aid of wheel sensors in a drive train of the vehicle; and performing a differentiated recognition of the instantaneous wheel torques which are too high for various driving situations.

2. The method according to claim 1, further comprising:
recognizing too high a difference of wheel torques at the drive train.

3. The method according to claim 1, wherein the recognition includes a comparison to a maximum value.

4. The method according to claim 1, wherein a wheel torque which is too high is recognized by a comparison to a maximum value and by a missing acceleration.

5. The method according to claim 4, further comprising:
determining the acceleration from signals of a respective wheel sensor in the drive train.

6. The method according to claim 4, further comprising:
setting maximum values for wheel torques and a maximum value for a difference of wheel torques at the drive train as a function of information about a transmission step engaged.

7. The method according to claim 1, further comprising:
limiting the engine torque via an engine interface by one of: an electronic throttle control, a fuel-injection blank-out and an ignition timing adjustment at the engine.

8. A system for limiting an engine torque of a vehicle, comprising:
wheel sensors for supplying signals, for respective wheels of the vehicle;
an evaluation unit for receiving the signals, determining wheel torques as a function of the signals and supplying the wheel torques;
a limiting unit; and
a recognition unit for receiving the wheel torques, carrying out an analysis for a specific driving situation and activating the limiting unit when the recognition unit determines that a limiting is necessary.

9. The system according to claim 8, wherein the limiting unit includes an engine interface.

* * * * *